United States Patent
Pecho et al.

(10) Patent No.: US 6,305,734 B1
(45) Date of Patent: Oct. 23, 2001

(54) FOLDING SLIDING ROOF ARRANGEMENT

(75) Inventors: Walter Pecho, Ringelai; Georg Kopp, Platting, both of (DE)

(73) Assignee: Bonnekamp & Sparing, Duesseldorf (DE)

( * ) Notice: Subject to any disclaimer, the term of this patent is extended or adjusted under 35 U.S.C. 154(b) by 0 days.

(21) Appl. No.: 09/643,335

(22) Filed: Aug. 22, 2000

(30) Foreign Application Priority Data

Aug. 23, 1999 (DE) ............................................. 199 39 954

(51) Int. Cl.$^7$ ....................................................... B60J 7/00
(52) U.S. Cl. ................ 296/107.01; 296/107.09; 296/107.11; 296/107.13; 296/116
(58) Field of Search .......................... 296/107.09, 107.11, 296/107.13, 116

(56) References Cited

U.S. PATENT DOCUMENTS 5,207,474  5/1993  Licher et al. ...................... 296/107

FOREIGN PATENT DOCUMENTS

| 19531074 | 9/1996 | (DE) . |
| 19731330 | 2/1999 | (DE) . |

Primary Examiner—Joseph D. Pape
Assistant Examiner—Kiran B. Patel
(74) Attorney, Agent, or Firm—Davidson, Davidson & Kappel, LLC

(57) ABSTRACT

The invention relates to a folding roof arrangement for a convertible type motor vehicle comprising a folding covering having a front section, a front crossmember, the front end section being fastened to the front crossmember, a plurality of lateral roof links defining part of a folding-top kinematic arrangement, wherein the front crossmember is shiftable in an infinite variable manner relative to the lateral roof links between a closed position and a half open position of the folding arrangement, the lateral roof links being in the same configuration in said closed position and in said half open position of the folding arrangement, and wherein in an open position of the folding roof arrangement, the front crossmember, the plurality of roof links and the folding covering are deposited one above another in a folding-top compartment so that at least two of the plurality of roof links define an essentially V-shaped folded arrangement. The invention further relates to a method for operating a folding roof arrangement for a convertible type motor vehicle, the folded roof arrangement including a folding covering having a front end section, a front crossmember, the front end section being fastened to the front crossmember, and a plurality of roof links defining part of a folding-top kinematic arrangement, the method comprising the steps of: shifting the front crossmember in an infinitely variable manner relative to the lateral roof links between a closed position and a half open position while the lateral roof links remaining unchanged, and depositing the front crossmember, the folding covering and at least two of the plurality of roof links into a folding-top compartment so as to define an open position and so that at least two of the plurality of roof links define an essentially V-shaped folded arrangement.

12 Claims, 3 Drawing Sheets

FOLDING SLIDING ROOF ARRANGEMENT

BACKGROUND OF THE INVENTION

The present invention relates quite generally to a folding sliding roof arrangement for a motor vehicle, and relates in particular to a folding sliding roof arrangement.

Conventional folding sliding roofs are known in the case of vehicles from various manufacturers. These are generally motor vehicles having a closed construction, i.e. having a roof. The folding sliding roofs used there are used as a replacement for or enlargement of a conventional sliding roof.

Folding sliding roofs have hitherto not been known in the sphere of open vehicles, i.e. convertibles and roadsters.

DE 197 34 671 discloses a folding roof arrangement which has a folding covering whose front end is fastened to a roof cap/a front crossmember. Before the closed folding roof is opened, this roof cap can be detached from a windshield frame and shifted slightly rearward by means of a spring element. The purpose of this arrangement is to take the tension out of the folding covering in order to relieve the load on the folding-top kinematic arrangement during the subsequent complete opening of the folding roof.

A specific, partial opening of a folding roof, which is used as a folding top in a convertible or roadster, has not been disclosed in the prior art.

SUMMARY OF THE INVENTION

The object of the present invention is therefore to provide a folding roof arrangement for a convertible-type of motor vehicle, which arrangement, in addition to the known functioning of closing and completely opening the folding top, also enables partial opening of the folding roof.

In this connection, one aim of the present invention is to provide a folding roof arrangement of this type whose design is as simple as possible and which can therefore be produced cost-effectively.

Accordingly, the folding roof arrangement according to the present invention for a convertible type of motor vehicle has a folding covering, whose front end section is fastened to a front crossmember, and a number of lateral roof links which form part of a folding-top kinematic arrangement, it being possible for the front crossmember to be shifted or displaced in an infinitely variable manner relative to the lateral roof links between a closed position and a half open position, and these lateral roof links remaining in the closed position of the folding roof arrangement.

It is thereby possible to shift the folding top of the open vehicle from a closed position into a partially open position and at maximum into the half-open position. Infinitely variable shifting of the folding covering between the closed position and the half open position is possible, with the result that the functionality of a sliding roof is realized for the first time in the case of a convertible or roadster.

BRIEF DESCRIPTION OF THE DRAWINGS

The abovementioned object, the aim, the features and advantages of the present invention can be better understood with consideration of the following, detailed description of the preferred embodiments of the present invention and with reference to the associated drawings.

The present invention is explained in greater detail in the following with reference to the drawings, in which.

Figure 1:
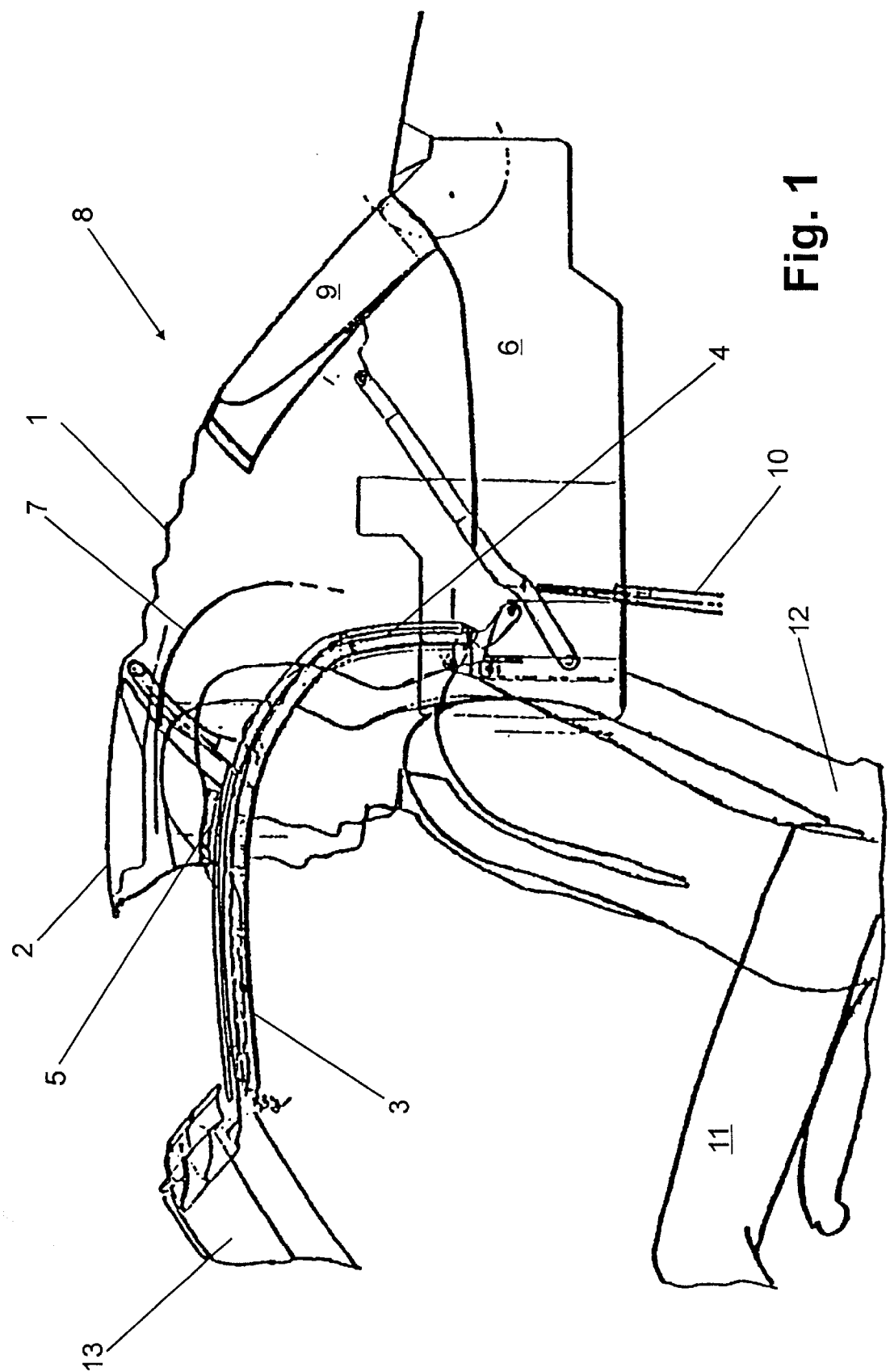
FIG. 1 shows a schematic side view of part of a motor vehicle on which the folding roof arrangement according to the present invention is provided, the folding roof arrangement being situated in the half open position.
Figure 2:
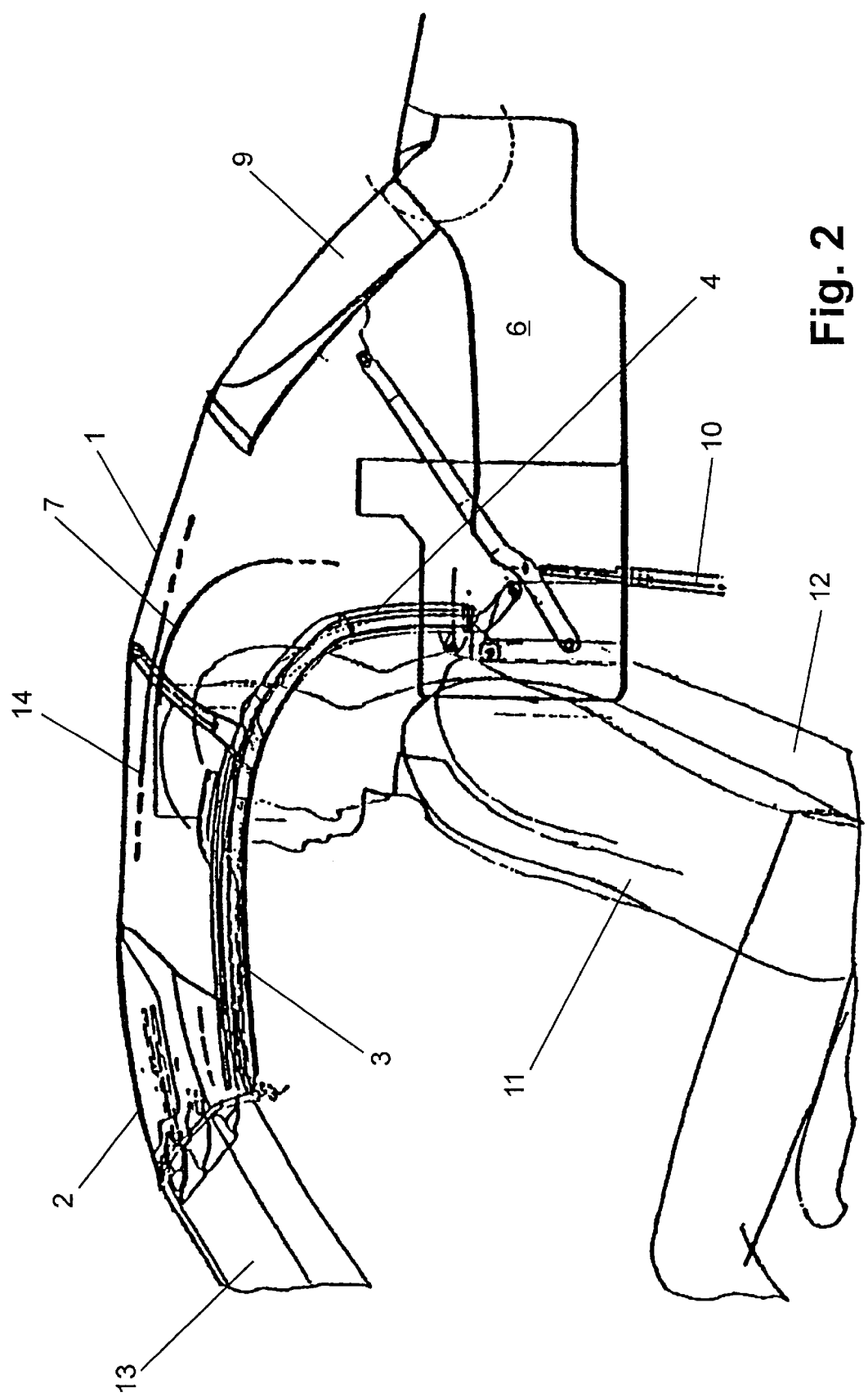
FIG. 2 shows a further schematic side view of part of a motor vehicle on which the folding roof arrangement according to the present invention is provided, the folding roof arrangement being situated in the closed position.

A preferred embodiment of the present invention is illustrated schematically in FIGS. 1 and 2.

DETAILED DESCRIPTION

In the case of a convertible type of motor vehicle, for example a two-seater roadster, a folding roof arrangement is provided between a front roof end, i.e. a frame of a windshield 13, and a rear roof end, i.e. in the vicinity of a trunk or engine compartment (in the case of a rear engine or centrally placed engine).

The folding roof arrangement according to the invention can be shifted from the closed position according to FIG. 2 into a half open position according to FIG. 1. For this purpose, on part of the folding-top kinematic arrangement 15, namely on a front roof link 3, a sliding guide 5 is provided in the form of a roller arrangement which allows a front crossmember 2 to be shifted relative to these front roof links 3.

In the open position the folding roof arrangement is completely folded together in a folding-top compartment 6 and can be shut away such that it is no longer visible from the outside by using a lid (not shown) of the folding-top compartment.

Figure 3:
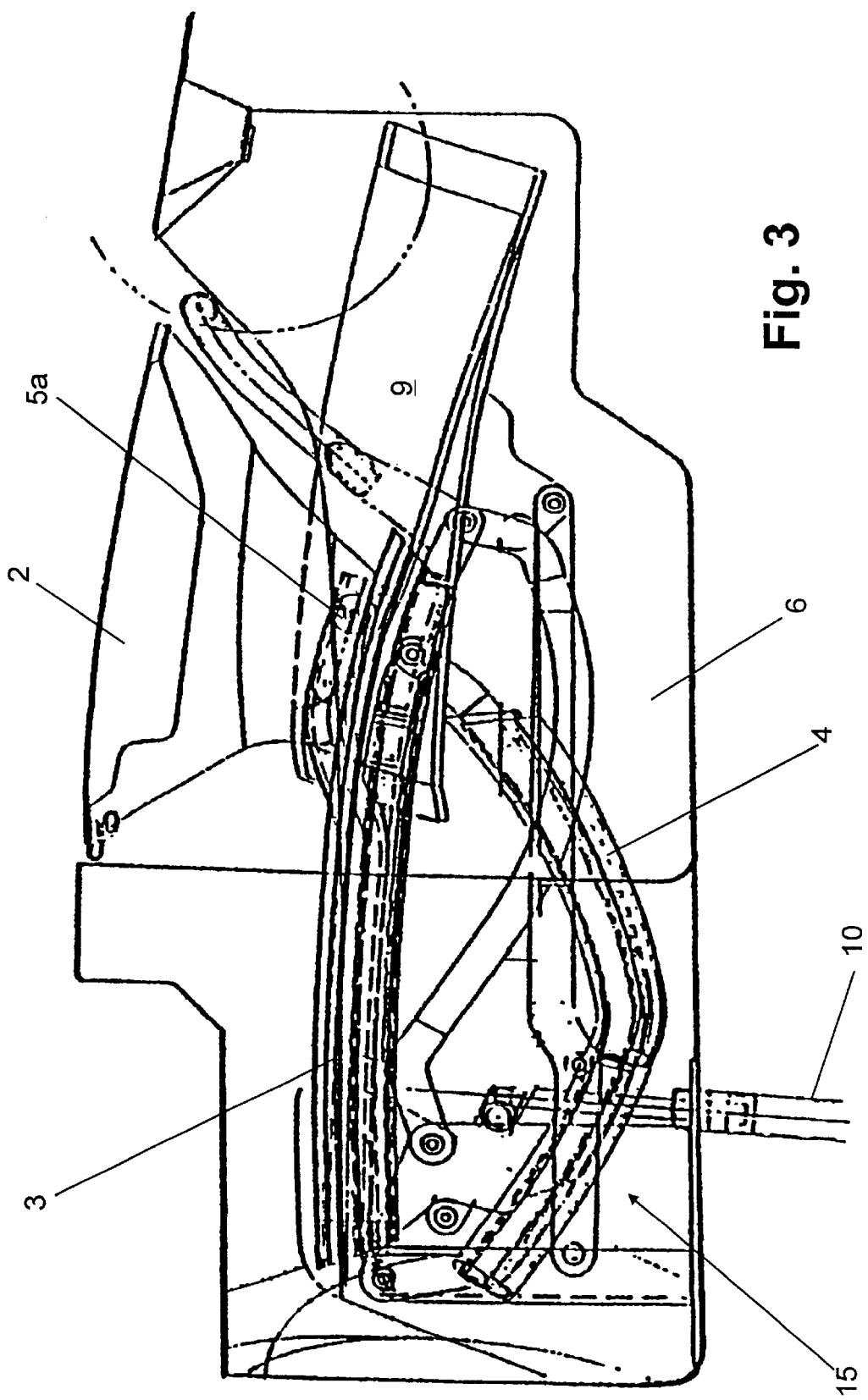
FIG. 3 shows a schematic, enlarged side view of a folding-top compartment having a folded-in folding roof arrangement.

This completely folded-in state of the folding top or the folding-top kinematic arrangement 15 is illustrated on an enlarged scale in FIG. 3.

The folding roof arrangement according to the invention can be shifted from the closed position according to FIG. 2 into a half open position according to FIG. 1. For this purpose, on part of the folding-top kinematic arrangement 15, namely on a roof link 3, a sliding guide 5 is provided in the form of a roller arrangement which allows a front crossmember 2 to be shifted relative to these roof links 3.

In the embodiment shown, the roller arrangement 5*a* is designed with two rollers in each case (see FIG. 3) on each side in order to counteract a tilting moment of the front crossmember 2.

After the front crossmember 2 has been detached from the frame of the windshield 13, the front crossmember 2 can be moved rearward manually, or preferably in a power-assisted manner, specifically in an infinitely variable manner and until it essentially reaches a half open position situated in the region of a head circle 7.

In the preferred embodiment shown, two roof links 3 and 4 are provided on each side (as seen in the direction of travel) of the vehicle, the front roof link 3 being arranged between the windshield 13 and the second, rear roof link 4. The rear roof link 4 is coupled to the folding-top bearing arrangement.

A driving cylinder 10 for the folding-top mechanism acts on the folding-top kinematic arrangement 15 in the region of the folding-top compartment 6 and can preferably be designed as a hydraulic cylinder.

When a folding covering 1, which forms the outer skin of the closed folding top, is moved, specifically from the closed position according to FIG. 2, in which the folding covering 1 is tensioned, into the half open position according to FIG. 1, in which the folding covering 1 is placed in folds (indicated in FIG. 1) in the region between the front crossmember 2 and a rear section 8 of the folding top, a rear window 9, which is provided in the rear section 8, remains in its position.

The half open position of the folding covering 1 therefore at least permits the functioning of a sliding roof in the case of a folding top of a roadster. Shifting the folding covering 1 with the aid of the roller arrangement: 5 relative to the front roof link 3 is possible in an infinitely variable manner. The folding covering 1, which has an inner roof lining 14, is placed in folds in a region, namely behind the occupants, in such a manner that a disturbance is not caused. In the process, the rear window 9 retains its position, further enabling the view rearward.

Only when the folding top is moved from this half open position into the completely open position is the folding-top kinematic arrangement 15 completely folded in and deposited in the folding-top compartment 6.

The number of roof links 3 and 4 on each side is reduced to two, so that a simple design of the folding-top kinematic arrangement 15 is ensured. The storage in the folding-top compartment 6 takes place essentially in a V-shape, the front roof link 3 coming to lie above the rear roof link 4.

In another embodiment, not illustrated in the drawing, of the present invention three roof links can also be provided in each case, these then being deposited in the folding-top compartment 6 preferably in a Z-shape. The folding covering 1 is then likewise folded in a Z-shape.

The head circle 7, which essentially surrounds the range of movement of a head of an occupant 11 of the vehicle sitting on one of the seats 12, marks the region which should not be contacted by the folding roof arrangement. Contact here is understood to mean that no part of the folding top or of the folding-top kinematic arrangement 15 may penetrate into this region, since otherwise there would be the risk of injuring an occupant 11. An impairment of the view of the driver of the vehicle may also not occur.

In a further preferred embodiment of the present invention, the sliding guide 5 explained above, which is designed in the form of a roller arrangement, can be replaced by a 4-bar linkage (not illustrated in the drawing). Shifting of the front crossmember 2 from the closed position into the half open position then takes place by pivoting the 4-bar linkage. In such a 4-bar linkage the four linkages are arranged in the shape of a parallelogram. In the closed position, the two linkages which are arranged on the front roof link 3 are situated virtually in one plane with the two other linkages which bear the front crossmember and the roof frame. During opening, the two linkages which bear the front crossmember pivot upward and then rearward and downward relative to the two linkages fixed to the roof link 3.

The folding roof arrangement according to the invention for a convertible type of motor vehicle accordingly has a folding covering 1, whose front end section is fastened to a front crossmember 2, and also a number of lateral roof links 3 and 4 which form part of a folding-top kinematic arrangement 15, it being possible for the front crossmember 2 to be displaced in an infinitely variable manner relative to the lateral roof links 3 and 4 between a closed position and a half open position, and the lateral roof links 3, 4 remaining in the closed position of the folding roof arrangement. This makes it possible to shift the folding top of the open vehicle from a closed position into a partially open position until at maximum into the half open position. Infinitely variable displacement of the folding covering 1 is possible between the closed position and the half open position, so that the functionality of a sliding roof is provided for the first time in the case of a convertible or roadster.

With regard to features of the invention which are not specifically explained above in greater detail, reference is expressly made to the patent claims and the drawings.

What is claimed is:

1. A folding roof arrangement for a convertible type motor vehicle comprising:
    a folding covering having a front end section;
    a front crossmember, the front end section being fastened to the front crossmember; and
    a plurality of lateral roof links defining part of a folding-top kinematic arrangement;
    wherein the front crossmember is shiftable in an infinitely variable manner relative to the lateral roof links between a closed position and a half open position, the lateral roof links being in a same configuration in the closed position and in the half open position of the folding roof arrangement, and
    wherein in an open position of the folding roof arrangement, the front crossmember, the plurality of roof links and the folding covering are deposited one above another in a folding-top compartment so that at least two of the plurality of roof links define an essentially V-shaped folded arrangement.

2. The folding roof arrangement as recited in claim 1 wherein the front crossmember is shiftable manually.

3. The folding roof arrangement as recited in claim 1 wherein the front crossmember is shiftable in a power-assisted manner.

4. The folding roof arrangement as recited in claim 1 wherein the front crossmember is arranged displaceably on the front, lateral roof links through a sliding guide.

5. The folding roof arrangement as recited in claim 1 wherein the arrangement is provided as a folding top for a two-seat motor vehicle.

6. The folding roof arrangement as recited in claim 1 wherein in the half open position the front crossmember is positioned approximately in the region of a head circle.

7. The folding roof arrangement as recited in claim 1 further comprising a rear section and wherein in the half open position the folding covering is folded between the front crossmember and the rear section.

8. The folding roof arrangement as recited in claim 7 wherein the rear section includes a rear window.

9. The folding roof arrangement as recited in claim 8 wherein the rear window is not shifted during an infinitely variable displacement of the front crossmember.

10. The folding roof arrangement as recited in claim 1 wherein the plurality of roof links consists of two roof links.

11. The folding roof arrangement as recited in claim 1 wherein the plurality of roof links consist of three roof links, which define an essentially Z-shaped folded arrangement in the open position.

12. A method for operating a folding roof arrangement for a convertible type motor vehicle, the folded roof arrangement including a folding covering having a front end section, a front crossmember, the front end section being fastened to the front crossmember; and a plurality of lateral roof links defining part of a folding-top kinematic arrangement, the method comprising the steps of:

shifting the front-cross member in an infinitely variable manner relative to the lateral roof links between a closed position and a half open position while the lateral roof links remaining unchanged, and depositing the front cross-member, the folding covering and at least two of the plurality of roof links into a folding-top compartment so as to define an open position and so that at least two of the plurality of roof links define an essentially V-shaped folded arrangement.

* * * * *

UNITED STATES PATENT AND TRADEMARK OFFICE
CERTIFICATE OF CORRECTION

PATENT NO. : 6,305,734 B1  
APPLICATION NO. : 09/643335  
DATED : October 23, 2001  
INVENTOR(S) : Pecho et al.

It is certified that error appears in the above-identified patent and that said Letters Patent is hereby corrected as shown below:

On the title page, item (73) Assignee:

"Bonnekamp & Sparing, Duesseldorf (DE)"

should be changed to

-- Edscha Cabrio-Verdecksysteme GmbH, Hengersberg (DE) --.

Signed and Sealed this

Twenty-fifth Day of March, 2008

JON W. DUDAS  
*Director of the United States Patent and Trademark Office*